Patented June 20, 1939

2,163,527

UNITED STATES PATENT OFFICE 2,163,527

METHOD OF PREPARING A DECOLORIZING MATERIAL AND OF DECOLORIZING LIQUIDS THEREWITH

Lyle Caldwell, Los Angeles, Calif.

No Drawing. Application July 22, 1938, Serial No. 220,801

13 Claims. (Cl. 252—2)

This invention relates to a method of producing, by synthesis, a decolorizing or bleaching material of advantageous physical properties and to a method of decolorizing liquids therewith.

This application is a continuation-in-part of my copending applications Serial Nos. 18,343, filed April 26, 1935, and 168,749, filed October 13, 1937, each of which copending applications was filed as a continuation-in-part of my application Serial No. 755,639, filed December 1, 1934. This application is also a continuation-in-part of my copending application Serial No. 136,354, filed April 12, 1937, allowed May 20, 1938.

One of the particular objects of the present invention is to provide a process for preparing a synthetic material having pronounced decolorizing properties, both with respect to oleaginous and aqueous materials, a high filtration rate as compared with most inorganic bleaching materials, and a remarkably low "cake retention", that is, the retention of the filtrate in the filter cake.

A further object of the invention is to provide a method of producing a synthetic bleaching material at a low cost as compared with hitherto proposed methods. The principal feature of the invention with respect to such lower costs is in the employment of relatively cheap and readily available raw materials.

The materials produced according to the present invention comprises, essentially, a hydrated magnesium silicate, which material may be associated with a hydrated aluminum silicate under some circumstances of manufacture, or with certain relatively inert diluent materials, such association being either wholly physical, partly physical and partly chemical, or wholly chemical. In the aforementioned application Serial No. 168,749, filed October 13, 1937, a bleaching material was described as being prepared according to a base exchange reaction in aqueous phase in which an anhydrous calcium-containing silicate was converted into a hydrated magnesium silicate compound. It has now been determined that a hydrated magnesium silicate compound having the desired bleaching properties may be prepared from other advantageous starting materials, with an important saving in the cost of carrying out the process.

The decolorizing or adsorptive power of a particular bleaching material appears to be primarily dependent upon the physical characteristics of that material, and only secondarily dependent upon the chemical constitution of the material. For example, hydrous magnesium silicates occurring in nature have been found, with but few exceptions, to have substantially no bleaching power, while certain synthetically produced hydrated magnesium silicates have been found to possess extremely important bleaching properties, making them suitable for many uses. The physical properties of these synthetically produced hydrated magnesium silicates have been found to vary considerably, dependent upon the method of manufacture of the material. The process employed to produce the synthetic material seems to be the principal controlling factor, inasmuch as two synthetic hydrated magnesium silicates of substantially identical chemical constitution have been found to be wholly different materials as regards their physical properties in decolorizing procedures. The physical properties of such silicate materials, which determine their efficiency and advantages as bleaching materials, are difficult to define except in terms of the specific method employed in manufacturing the same. The present invention involves the discovery that a particular type of hydrated magnesium silicate prepared according to a specific process is a highly advantageous decolorizing material with respect to both oleaginous and aqueous liquids.

A further object of the invention therefore is to provide a method of decolorizing liquids through the agency of a synthetically prepared hydrous magnesium silicate material having said improved physical characteristics.

According to the present invention, a reaction is caused to take place in the presence of water and at a superatmospheric temperature, under conditions of agitation, between a soluble magnesium compound and a calcium silicate comprising either a natural silicate (such as wollastonite, diopside, or other calcium-containing pyroxene), or a synthetic calcium silicate made either by fusion, sintering, or by aqueous reaction. The reaction may be carried out by simply boiling and agitating the mixture at atmospheric pressure, or by heating the mixture under conditions of agitation to any other temperature which is practicable, or may be carried out at a faster rate by heating the mixture to a higher temperature under superatmospheric pressure, as in an autoclave or other pressure equipment, under conditions of agitation. The calcium silicate, and any other solid accompanying material such as subsequently will be disclosed, is preferably present in finely divided condition during the reaction.

It appears preferable that the finished product comprise a hydrated magnesium meta-silicate having the general formula $MgO \cdot SiO_2 \cdot nH_2O$, although compositions may be prepared in which the $SiO_2$ occurs in a lesser or greater proportion than equimolecular to the magnesium oxide. Where the starting material comprises a calcium meta-silicate such as wollastonite, the soluble magnesium compound may be employed in such amount as to effect a partial or substantially complete replacement of the calcium by magnesium, and where the calcium silicate employed contains a proportion of magnesium, as in the case of diopside, the proportion of soluble magnesium salt may be decreased in direct proportion to the content of magnesium in such silicate. In any case, the proportion of magnesium salt employed should be sufficient to react with a substantial proportion of the calcium-containing silicate present and to form a solid product containing a substantial proportion of hydrated magnesium silicate produced by such reaction. In some cases, a molecular excess of magnesium salt over the calcium-containing silicate may be employed, but advantageous bleaching materials may be prepared by the use of substantially molecularly equivalent proportions of magnesium salt and calcium-containing silicate. I have found, further, that considerably less than a theoretical amount of the soluble magnesium salt may be employed, and in actual practice I have prepared efficient decolorizing materials which contain somewhat less than 50% of hydrated magnesium silicate, calculated as $MgSiO_3 \cdot H_2O$.

If it is desired to form a product having a molecular proportion of silica to magnesia greater than the molecular proportion of silica to lime+magnesia in the material employed as a source of calcium silicate, I may add free silica to the starting materials; similarly, if it is desired to form a product having a molecular proportion of silica to magnesia less than the molecular proportion of silica to lime+magnesium in the material employed as a source of calcium silicate, I may add free lime (or its reactive equivalent) to the reaction mixture, and add a sufficient amount of the soluble magnesium compound to satisfy the entire quantity of lime (combined and uncombined) present in the mixture. (Where the word "lime" is used herein in connection with the description of combined constituents of a starting material, it will be understood to mean calcium oxide (CaO) as such would be reported in a chemical analysis, and the expressions "added lime" or "free lime" may be taken as CaO, $Ca(OH)_2$, or $CaCO_3$, which are reactive equivalents). For example, where lime, or lime+magnesia, is present in the starting material in molecular excess over the combined silica (i. e., where the acid-base ratio is less than unity), it may be preferable to add free silica to the starting materials whereby a greater (substantially equimolecular, for example) ratio of silica to magnesia is obtained in the finished product. Similarly, where the proportion of combined silica to combined lime, or to lime plus magnesia, in the starting material is greater than equimolecular (i. e., where the acid-base ratio is greater than unity), a quantity of free lime may be added to provide for reaction with the anion of the added magnesium compound, the latter compound being added in sufficient amount to provide for formation of a product having a lesser acid-base ratio (for example, one containing substantially equimolecular proportions of magnesia and silica).

In the above-mentioned application Ser. No. 168,749 one of the specific phases of the present process is disclosed in detail and specifically claimed, namely, that of employing a calcium-containing pyroxene, such as wollastonite or diopside, as the starting material. A comparable starting material may be prepared by mixing equimolecular or other desirable proportions of calcium and silicon oxides and causing a combination thereof in any suitable manner, as by fusing the same to form a glass or by autoclaving the same in aqueous phase to form a hydrated calcium silicate. Similarly, the conventional blast-furnace slag or other commercially available slags such as open hearth and electric-furnace slag, may be employed as the starting material, as such materials consist principally of lime and silica in combination. Another advantageous type of starting material is a material such as Portland cement or Portland cement clinker, which contains a material excess of calcium over silica, and this material may be employed along with added silica in the hydrothermal reaction with the soluble magnesium compound. In Portland cement, practically all the calcium present is in combination with other materials in the cement in compounds such as dicalcium silicate, tricalcium silicate, tricalcium aluminate, etc., and when a hydrothermal reaction of such a starting material is carried out in the presence of added silica it appears possible that there is a reassociation of the calcium in the formation of meta-silicates, which, after replacement of the calcium by magnesium, provides a hydrated magnesium silicate having the desired properties.

1. As a specific example of the practise of the present invention, 1000 grams of finely ground Portland cement having a lime content of 64.96%, a magnesia content of 3.44% and a silica content of 21.24%, was reacted with 500 grams of finely divided hydrated silica and 1300 grams of $MgCl_2$, in the presence of 10 liters of water. The mixture was boiled at atmospheric pressure for 10 hours, filtered, washed, and approximately 1500 grams of product was recovered. This product was found to have a high filtration rate and a very high bleach on vegetable, animal and mineral oils.

2. As a further example, 1000 grams of a synthetic hydrated calcium silicate, prepared by hydrothermal reaction of equimolecular proportions of lime and silica, was autoclaved three and one-half hours at a steam pressure of 500 lbs. in the presence of a molecular excess of $MgCl_2$ in water solution, the batch being continuously agitated by tumbling the autoclave. The solid material was then separated by filtration, and after washing and drying was found to have a bleaching efficiency comparable to the above-mentioned material prepared from Portland cement.

3. As a further example, 1000 grams of finely ground wollastonite was subjected to hydrothermal reaction under agitation at a superatmospheric pressure with an equimolecular proportion of MgCl₂. After reaction, the product was found to have a very high bleach and good filtration efficiency.

4. 1,000 grams of finely ground wollastonite was subjected to hydrothermal reaction at a steam pressure of 500 pounds with an equimolecular proportion of MgCl₂ for two hours. The resulting material was filtered, washed, and approximately 1,000 grams of product were recovered. After drying, this product was found to have a high filtration rate and a very high bleach on vegetable, mineral, and animal oils, comparing favorably with the best obtainable grades of natural bleaching clays with respect to its use on vegetable and animal oils, and with the best obtainable grades of acid-treated clays in use on mineral oils.

5. As a further example, 1,000 grams of a synthetic hydrated calcium silicate, prepared by hydrothermal reaction of equimolecular proportions of lime and silica, was boiled two hours in the presence of a molecular excess of MgCl₂ in water solution. The solid material was then separated by filtration, and after washing and drying was found to have a bleaching efficiency comparable to the above-mentioned material prepared from Portland cement.

6. As a further example, 1,000 grams of synthetic hydrated calcium silicate, prepared by precipitation from a solution of calcium chloride by the addition of soluble sodium silicate, and containing substantially equimolecular proportions of lime and silica, was boiled for 25 minutes in the presence of a slight molecular excess of MgSO₄ in water solution. The solid material was then separated by filtration, and after washing and drying was found to have a bleaching efficiency comparable to the above-mentioned material prepared from the above-mentioned synthetic hydrated calcium silicate and magnesium chloride. By analysis this material contained approximately 57% of CaSO₄.2H₂O, which had no significant effect on the bleaching characteristics of the material upon California "Lube" stock, by test.

7. As a further example, a quantity of synthetic hydrated calcium silicate prepared by precipitation in accordance with the teaching of Serial No. 63,376 was autoclaved for two hours at 350° F. with an aqueous brine containing 8½% anhydrous MgCl₂, sufficient brine being employed to provide only about 40% of the proportion of MgCl₂ required for complete reaction of the calcium silicate raw material. The solid reaction material was then separated from the soluble reaction products by filtration, followed by water washing, and after drying was found to have a bleaching efficiency comparable to the products produced according to Examples 1 through 6.

In general, the soluble magnesium salt may be dissolved in a quantity of water such that the concentration of salt in solution will be between 8% and 32% by weight, calculated on the basis of the anhydrous salt.

In any of the above examples of procedure, it is in general desirable to recover the bleaching material as a substantially dry powder, particularly where the material is to be used at a point removed from the place of manufacture. It is preferable that the material be dried at a temperature not in excess of 250° F. in order to prevent loss of water of hydration, but it is not essential that the uncombined moisture content be reduced to anywhere near zero per cent, although it is usually desirable to reduce the uncombined moisture content to at least 6% or 8%. Where the material is to be used at or adjacent the place of manufacture, the necessity for reducing the material to a dry state is dependent purely upon the effect of the contained moisture on the bleaching process in which the material is to be used. In the filtration of some aqueous liquids it is possible to use the material in the form of a slurry, and where a procedure is followed in which magnesium sulphate is employed as the soluble magnesium salt, the material may be used directly following the base-exchange reaction without water washing, inasmuch as all of the reaction products are substantially water insoluble.

When it is desired to prepare the decolorizing material for use in dry powdered condition, a portion of the aqueous liquid present following the reaction may be removed mechanically, as by filtration or thickening, and the material may then be reduced to the desired condition of dryness by heating as described above. The dried material is comparatively soft and may easily be reduced to a powdered state by light attrition. The degree of subdivision or particle size distribution of the dried material will obviously affect the filtration rate of the material, and in the succeeding examples comparing this material with commercially comparable natural and acid-activated clay materials, the products prepared for test according to the present method were reduced to powdered condition by brushing a dried cake of the material through a 100-mesh screen. Accentuated flow rates are secured if the material is died in a so-called "spray drier."

It is not essential that the calcium be fully combined with other constituents of the starting materials as in the case of Portland cement which is completely clinkered, in view of the fact that an incompletely burned Portland cement mixture such as the so-called "treater-dust" may be advantageously employed for reaction according to the present process. This "treater-dust", being a product reclaimed from the stack gases coming from a cement kiln, contains the principal proportion of its calcium content in free and uncombined state, and an advantageous starting mixture for the present process may be prepared by adding sufficient silica to such a treater-dust to provide the desired ratio of CaO to SiO₂. Under some conditions I prefer to calcine the treater-dust to convert any contained calcium carbonate to calcium oxide, before using the material in the hydrothermal reaction. It will be obvious that where the starting material contains an excess of SiO₂ over CaO, as in the case of an acid electric-furnace slag, free CaO may be added to the mixture to determine the desired CaO:SiO₂ ratio.

The hydrothermal reaction with the soluble magnesium compound has been found to progress with substantially all soluble magnesium salts, such as magnesium bromide, magnesium chloride, magnesium chromate, magnesium nitrate, and magnesium sulphate. Of the above salts, only magnesium chloride and magnesium sulphate are at present commercially feasible, in view of the low cost thereof as compared with other soluble magnesium compounds. Magnesium chloride and magnesium sulphate, or mixtures thereof, react quite advantageously in the base exchange reaction, the magnesium becoming associated with the silica or silicate radical to form the hydrated magnesium silicate and the anion or acid radical of the magnesium salt becoming associated with the calcium in the starting material in the formation of a calcium salt, such as calcium chloride, calcium sulphate, or mixtures thereof. Where calicum chloride is the result of the reaction, it may be easily removed from the magnesium silicate by water washing, but it has not been found feasible to separate the comparably produced calicum sulphate. At the same time, it has been determined that calcium sulphate present with the magnesium silicate as an associated material does not detract from the bleaching capabilities of the magnesium composition other than by acting as a diluent, though the decrease in decolorizing efficiency of the material does not directly follow the proportion of calcium sulphate present. For example, a material produced as above described and containing approximately 30% of $CaSO_4 \cdot 2H_2O$ was found to have a bleaching efficiency substantially equivalent to another material containing no gypsum, made under substantially equivalent conditions with magnesium chloride.

The use of magnesium sulphate as the soluble magnesium compound provides a highly advantageous process feature, in that the hydrothermal base-exchange reaction may be caused to take place rapidly at a relatively low temperature, thereby avoiding undue difficulty from corrosion. In this connection, one of the important methods for producing the hydrated magnesium silicate comprises a formation of a hydrated calcium-containing silicate, either by an aqueous precipitation process such as the precipitation resulting from the intermixture of a solution of a soluble calcium salt such as calcium chloride, and a soluble alkali silicate such as sodium silicate, or by hydrothermal interaction of free lime and silica. This hydrated calcium silicate may then be converted into the desired hydrated magnesium silicate by simple boiling at atmospheric pressure with a magnesium sulphate solution, in wooden or other suitable containers, wherefore corrosion difficulties are substantially completely eliminated. Where magnesium chloride is employed, a somewhat higher reaction temperature is in general required in order to obtain equally rapid reaction, usually requiring heating under pressure in metallic equipment, and the corrosive effects of magnesium chloride solutions on metallic equipment are well known.

A bleaching material prepared according to the present method is found to contain a material proportion of chemically combined water, and very probably has the composition represented by the formula $MgSiO_3 \cdot H_2O$, although the proportion of combined water may be subject to considerable variation. The material is particularly effective in the bleaching or decolorizing of vegetable and animal oils, being more efficient than any known inorganic decolorizing composition. The material also has a very advantageous flow rate in filtration, being higher than any of the natural decolorizing mixtures such as fuller's earth. Furthermore, the material has a comparatively low retention for oils as compared with previously produced synthetic magnesium silicates. The material does not slime in water solutions and may be employed in the bleaching and filtration of sugar liquors or the like, in which use its filtration rate is found to be higher than commercial diatomaceous earth, while at the same time providing a decided bleach. As far as is known, a material prepared according to the present method combines for the first time a strong bleaching action with a filter rate high enough that the material may be used primarily as a filtration medium.

The present invention has been carried out in the production of bleaching materials according to reactions of the following general types:

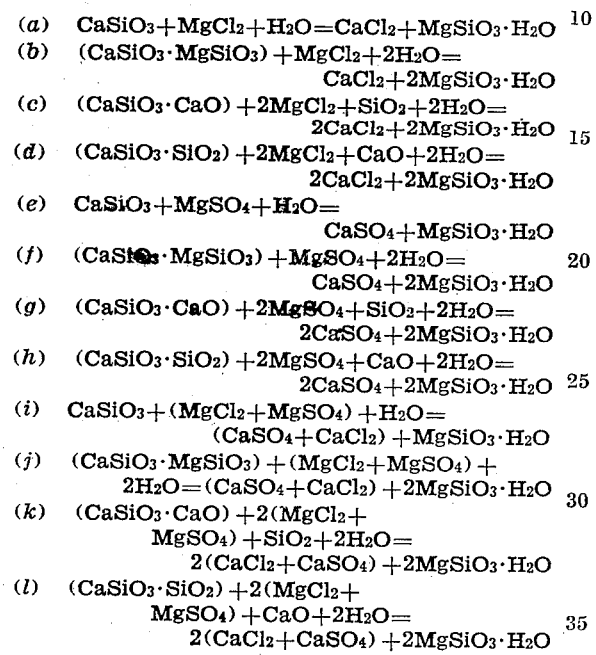

The above formulae or equations are intended to represent the type of reactions involved, rather than the specific molecular relations of materials employed. As examples of starting materials which may be used in the above equations, I note the following:

(a), (e) and (i)—Wollastonite, or synthetically produced calcium silicates.
(b), (f) and (j)—Diopside, or synthetically produced silicates containing calcium and magnesium.
(c), (g) and (k)—Portland cement or basic slags.
(d), (h) and (l)—Acid slags.

In Equations (a) through (d), in which $MgCl_2$ is employed, the reaction product $CaCl_2$ may be separated from the bleaching material by water-washing; in Equations (e) through (h), in which $MgSO_4$ is employed, the reaction product $CaSO_4$ (which actually occurs as $CaSO_4 \cdot 2H_2O$) is not readily separated from the bleaching material; and in Equations (i) through (l), in which mixtures of $MgCl_2$ and $MgSO_4$ are employed, the soluble $CaCl_2$ may be easily separated from the bleaching material while the insoluble $CaSO_4 \cdot 2H_2O$ remains associated with the material. It will be apparent that the proportion of $CaSO_4 \cdot 2H_2O$ in the finished product may be conveniently controlled and established at any selected value by a proportionment of $MgCl_2$ and $MgSO_4$ in the starting materials. As given in the above equations, the soluble magnesium salt employed is preferably a salt of a strong acid, that is, an acid stronger than silicic acid, whereby the anion of the magnesium salt will become associated with the calcium of the calcium silicate, and the weaker silicate anion will become associated with the magnesium ion in the formation of the desired magnesium silicate. The desired bleaching product, therefore, will generally contain the silica of the starting calcium-containing silicate, as well as any additional silicate resulting from the added silica.

The materials produced according to the present invention are of particular usefulness in the bleaching of oils and other liquid materials, in that the flow-rate (filtration efficiency) and the "cake-retention" characteristics of the material are considerably better than are found in previously suggested types of synthetic hydrated magnesium silicate bleaching materials, and in general considerably better than are found in any of the high-quality bleaching materials now commercially available. Furthermore, the flow-rate properties of the materials of the present invention are found to be on a par with or better than the flow-rate properties of the so-called high efficiency filtration materials, such as calcined diatomaceous earth, when used on oleaginous materials, wherefore, in addition to the bleaching power of the present materials, their filtration properties make them useful in cases where their properties as filtration media are of primary importance.

The filtration and "cake-retention" properties of the materials prepared by base-exchange reactions according to the present invention are found to be particularly affected by the physical conditions obtaining in the reaction procedure. More specifically, it has been found that agitation of the reacting mix is of particular importance in securing the desired physical properties in the material. The following examples of different methods of preparation of the bleaching material of the present invention are given to illustrate the effect of agitation on the physical properties of the finished material:

Four identical batches of raw material were mixed as follows:

| | Grams |
|---|---|
| Finely pulverized wollastonite (ball-milled to pass 200 mesh) | 40 |
| Commercial flake magnesium chloride | 68 |
| Water | 350 |

Each batch was sealed in a cylindrical copper-lined steel autoclave having an internal length of 15 inches, and a capacity of 34 cubic inches. The four autoclaves were placed in an insulated automatic temperature-controlled oven operating at 450° F. Three of these autoclaves were placed on end in a stationary position, while the other was clamped in a rotating carrier mechanism revolving at approximately 7 R. P. M. The apparatus was run at 450° F. for two hours and two of the autoclaves were removed, namely, the autoclave which had been agitated by revolving end for end (marked "A") and one of the stationary autoclaves (marked "B").

The two remaining autoclaves were left stationary in the oven for an additional nine hours time at 450° F., after which time one of the autoclaves was removed (marked "C") and the remaining autoclave was placed in the agitating mechanism and agitated at 450° for an additional three hours. This was then removed and marked "D".

When the contents of the respective autoclaves were removed, the material flowed or poured readily from A and D, while in B and C the material was caked in the bottom, showing that although at high temperature and pressure, no agitation occurred in the samples B and C during the hydrothermal reaction. The contents of each autoclave was filtered and washed on a suction filter; dried at 220° F. and repulverized by brushing through a 100 mesh sieve. Fifteen grams of sample C was segregated and the remainder mixed with 350 grams of water and placed in one of the autoclaves, which autoclave was then placed in the agitation mechanism and agitated at 450° F. for three hours, the contents being then removed from the autoclave, filtered and washed on a suction filter; dried at 220° F. and repulverized by brushing as above. This sample was marked "E".

Five samples thus resulted. Samples A and B had been subjected to identical treatment times and under treatment conditions which differed only in respect to agitation, sample A having been agitated throughout the treatment time and sample B not agitated at all. Sample C had been subjected to unagitated treatment for a period of 11 hours, while sample D had been subjected to unagitated treatment for 11 hours followed by three hours of agitating treatment. Sample E was identical with sample C with the exception that it had been subjected to simple agitation (for the same length of time as sample D) following the hydrothermal reaction, to determine whether the mechanical agitation of itself had any direct effect upon the physical properties of the material.

Bleach tests were run on samples A to E, using a semi-refined western red engine oil, the procedure being as follows:

A weighed amount of the sample was mixed with a weighed amount of the oil and the mixture slowly heated under mechanical agitation to a temperature of 320° F., whereupon the heated mixture was poured into a preheated pressure filter having a 2½-inch diameter horizontal filtration surface (comprising a sheet of Whatman No. 1 filter paper), followed by an application of air under pressure (10 P. S. I.) to force the oil through the filter.

After completion of the filtration, air was forced through the filter cake for 10 minutes at 10 pounds pressure, followed by steam at the same pressure for 15 minutes (this procedure being customary in the so-called "contact' treatment of lubricating oils). The cake was then removed and dried at 212° F. to remove any moisture, and weighed to determine the oil retention.

In view of the fact that filtration data was desired, a sixth sample (marked "F") was subjected to the same test as each of the above five samples, said sixth sample comprising a calcined diatomaceous earth filtration aid.

The results of the respective tests on samples A through F were as follows:

TABLE I

*Filtration and bleach tests—using 2 grams of sample in 100 grams of oil*

| Sample | Filtration rate | Oil retention (after steaming) | Bleaching efficiency (percent color removal) |
|---|---|---|---|
| | Grams/second | Percent | Percent |
| A | 25.0 | 10.5 | 15 |
| B | 12.5 | 12.0 | 15 |
| C | 12.5 | 12.5 | 15 |
| D | 25.0 | 12.5 | 18 |
| E | 12.5 | 11.0 | 15 |
| F | 8.5 | 21.1 | 0 |

Table II

*Filtration and bleach tests—using 6 grams of sample in 150 grams of oil*

| Sample | Filtration rate | Oil retention (after steaming) | Bleaching efficiency (percent color removal) |
|---|---|---|---|
| | Grams/second | Percent | Percent |
| A | 16.7 | 11.0 | 22 |
| B | 8.8 | 12.3 | 17 |
| C | 9.4 | 13.0 | 21 |
| D | 12.5 | 12.9 | 28 |
| E | 9.4 | 12.7 | 20 |
| F | 3.75 | 22.0 | 0 |

Additional tests were run on a solvent-refined western oil, the bleaching contact being carried out at 280° F. and the filtration being carried out at 5 pounds pressure, the lower temperature and filtration pressure being employed for the purpose of decreasing the filtration flow rate to secure a check on the flow rates shown in Table II. These tests were run on Samples A through E (the diatomaceous earth comparison sample being omitted). The results of these tests are shown in Table III.

Table III

*Filtration and bleach tests—using 4 grams of sample in 100 grams of oil*

| Sample | Filtration rate | Bleaching efficiency (percent color removal) |
|---|---|---|
| | Grams/second | Percent |
| A | 5.5 | 76 |
| B | 1.6 | 66 |
| C | 1.9 | 73 |
| D | 4.3 | 85 |
| E | 2.0 | 71 |

Samples A through D were analyzed to determine the percentage of residual calcium oxide in the material and calculations made as to the percentage of hydrated magnesium silicate in the bleaching materials, to give an indication of the degree or extent of reaction between the soluble magnesium salt and the calcium silicate, with the following results:

Table IV

| Sample | Total calcium as CaO | Approximate CaSiO₃ (calculated) | Approximate MgSiO₃.H₂O (calculated) |
|---|---|---|---|
| | Percent | Percent | Percent |
| A | 7.79 | 16 | 84 |
| B | 35.80 | 74 | 26 |
| C | 33.24 | 69 | 31 |
| D | 7.44 | 15 | 85 |

It will be noted that the bleaching efficiencies of the several materials are quite comparable in the several tests, although higher bleaching efficiencies were shown in the treatment of the solvent-refined western oil (Table III) than in the treatment of the so-called "Red engine" oil (Tables I and II). The reason for this difference is that the solvent-refined oil is relatively easily bleached, while in the case of the "Red engine" oil, which had been subjected to a different refining treatment, the residual color-producing material was of the more difficultly removed type.

When Samples A and B are compared, it will be seen that the filtration rate obtained with Sample A is substantially two or more times greater than the rate obtained with Sample B, while the actual color removal properties of the two materials are not significantly different. Sample A, therefore, when compared directly with a sample which had been reacted with the magnesium compound for the same length of time, in the absence of agitation, showed tremendous difference in filtration efficiency, considerable difference in cake-retention properties, and but a minor difference in bleaching efficiency. As shown in Table IV, the approximate proportion of hydrated magnesium silicate in the two materials is quite different; the ratio of calcium silicate to hydrated magnesium silicate in Sample A being approximately 1 to 5, while this ratio in Sample B is approximately 3 to 1. This indicates that the degree of base-exchange reaction obtained in the hydrothermal process is not the most significant criterion of the bleaching efficiency or general utility of the material.

Sample C, treated for a total of 11 hours un-agitated, as compared with two hours' agitation in the case of Sample A, shows a bleaching efficiency substantially identical with that of Sample A, and a filtration efficiency not significantly different from Sample B. The proportion of hydrated magnesium silicate in Sample C is somewhat greater than in Sample B, but in view of the comparatively close agreement between the bleaching efficiency of Samples A and C, it is further apparent that the actual chemical constitution or degree of reaction secured in the hydrothermal process is not controlling.

Sample D, having a total reaction time of 14 hours, of which the last three hours were under agitation, shows a much higher bleaching efficiency than Samples A, B, or C, but it is also apparent that the filtration rate of this material is inferior to that of Sample A (as shown in Tables II and III). The subsequent treatment of the material, under agitation, serves to improve the filtration efficiency to some extent and also increases the degree of reaction (see Table IV), but as shown in the oil retention data columns in Tables I and II, the oil retention was not significantly improved by this later agitating treatment.

Sample E, prepared to determine if agitation alone, in the presence of water but not during the reaction, served to accomplish the desired result in the material, shows a filtration rate and a bleaching efficiency about equal to Sample C from which it was prepared, and decidedly lower than that of Sample D.

The filtration rates of Samples A through E are in each case quite noticeably better than the filtration rate of the comparison sample of diatomaceous earth filter-aid (Sample F). This point is of minor interest, and serves merely to show the advantageous flow rates secured with materials prepared by the base-exchange hydrothermal reaction as disclosed in the present application.

The above-mentioned properties of high filtration rate and low cake retention, as far as this particular hydrated magnesium silicate material is concerned, have been found to be closely related to the "apparent volume" of the material. This "apparent volume" is determined by shaking one gram of the dry material in a quantity of fluid (such as water or in some cases an oleaginous fluid such as kerosene where water would have a tendency to swell the material) and centrifuging the mixture to a constant volume, the apparent volume being taken as the number of ccs. occupied by the centrifuged one gram of material. In general, the lower the apparent volume, the higher the filtration rate and the lower the cake retention. The apparent volume of the present material lies between 1.8 and 3.5 ccs. per gram, which distinguishes the material from all synthetic hydrated magnesium silicates having any substantial bleaching properties which are known to applicant, these latter materials averaging in excess of 4.0 ccs. per gram. Natural and acid-activated clays in general have a lower apparent volume than do the materials produced according to the above-described procedures, but the cake retentions exhibited by these natural and acid-activated clays are consistently higher, and the filtration rates are consistently lower, than in the materials used in the present process. It is apparent, therefore, that while the apparent volume is an index as to the filtering efficiency of synthetic hydrated magnesium silicates, the apparent volumes of other bleaching materials cannot be directly compared.

The process of the present invention may be compared directly with processes involving natural and acid-activated clay materials by consideration of the following tables. In the tests shown in Table V a material prepared in accordance with Example 7 above (and identified as "Caldwell G") is compared with the best obtainable grade of acid-activated clay on a "Mid-Continent Bright Stock", and in Table VI the Caldwell G material is compared with the best obtainable Texas clay on cotton oil, using the standard cotton oil test prescribed by the American Oil Chemists Society, except for the quantity of bleaching material used. (See "Official and Tentative Methods of the American Oil Chemists Society").

TABLE V

| Test conditions | Test oil: Mid-Continent bright stock | |
|---|---|---|
| | Caldwell G | Acid-activated clay |
| Quantity of oil used | 300 g. | 300 g. |
| Quantity of bleaching material | 45 g. | 50 g. |
| Temperature of treatment | 300° F. | 400° F. |
| Hot oil after contact cooled to 200° F. and mixed with 300 g. naphtha and filtered at 40# pressure: Filter time | 5 min. 30 sec. | 12 min. 45 sec. |
| Cake then washed with naphtha: Relative washing rate | 200% | 100% |
| Comparative bleaching obtained | 110% | 100% |
| Cake steamed at 20# steam pressure for 15 minutes: Weight of cake | 49.89 g. | 56.09 g. |
| Oil retention | 10.6% | 12.0% |

It will be noted from this table that 16⅔% by weight of the acid-activated clay was employed at a temperature of 400° F., while but 15% of Caldwell G material was employed at a temperature of but 300°, yet 10% better bleaching was secured with the Caldwell G material. The lower retention of oil exhibited by the Caldwell material is of particular interest inasmuch as the quantity of oil retained by the filtering material represents an operating expense which must be added to the cost of bleaching material in considering its desirability for use, and the rapid filtration rate of the Caldwell material is of direct economic benefit in use due to the saving in cost of equipment for the user, as well as the direct saving in time. It will be noted that the filtration efficiency in the step of washing the cake with naphtha is also much higher with the Caldwell material.

TABLE VI

| Test conditions | Test oil: Cotton oil | |
|---|---|---|
| | Caldwell G | Best Texas clay |
| Amount bleaching material used | 3.0% | 3.0% |
| Filter time | 5 min. | 17 min. |
| Steaming | 15 min. at 10# steam | 20 min. at 20# steam |
| Cake retention | 18.4% | 18.4% |
| Comparative bleaching efficiency | 300% | 100% |

In the above test the filter rate of the Caldwell G material is 3.4 times the rate of the natural earth, and while the cake retentions are equivalent, this result was secured by adjusting the steaming time and the steam pressure to secure that cake retention which is obtainable with a natural earth under standard steaming conditions, and the results indicate considerable saving in steam consumption as well as time.

In order to show the effect of temperature upon the bleaching properties of a Caldwell material and acid-activated clay, a number of tests were run to determine what temperatures of contact and percentages of acid-activated clay were required to secure N. P. A. colors of 8 and 5, respectively, on a Pennsylvania cylinder stock. Similar tests were conducted to determine the percentages of the Caldwell G sample required to secure equivalent colors. In general, with the Caldwell materials the full bleaching efficiency of the material is realized at adjacent 150° F. and is not materially increased by increasing the temperature of contact. With the best obtainable acid-activated clay very little bleach is secured unless the oil is raised to a temperature in the neighborhood of 300° F. and the bleaching efficiency of the clay increases gradually to 600° F., which is the highest temperature to which a lubricating stock can reasonably be carried. In all of these tests identical treatment times were employed, and the length of treatment time was for all samples sufficient to secure substantially all of the bleaching effect obtainable at that particular temperature. The results of these tests are shown in Table VII. In order to secure a satisfactory bleach with the acid-activated clay it was necessary to use abundant "bottom steam", although the introduction of steam was unnecessary in connection with the Caldwell material.

TABLE VII

| Material and percentage | Temperature comparison on "Penn. cylinder stock" | |
|---|---|---|
| | Temp. req. to reach N. P. A. color of 8 | Temp. req. to reach N. P. A. color of 5 |
| | °F. | °F. |
| Acid-activated clay—15% | 600 | Cannot be reached |
| Acid-activated clay—30% | 430 | 600 |
| Caldwell G—10% | 150 | Cannot be reached |
| Caldwell G—15% | | 150 |

It will be noted where 15% of acid-activated clay is employed, it is necessary to conduct the contact treatment at 600° F. in order to get a N. P. A. color of 8, and that while with 30% of acid-activated clay an 8 color is produced at 430°

F., it is necessary to employ a temperature of 600° F. with this quantity of material in order to secure a N. P. A. color of 5. The synthetic hydrated magnesium silicates produced and used according to the present process are remarkable in that in addition to the direct increase in bleaching efficiency on a weight-for-weight basis, the full bleach of a material is secured at a relatively low temperature instead of necessitating the use of relatively high temperatures as in the case of acid-activated materials (treatment at higher temperatures failing to give any significant increase in bleach). This feature is of tremendous economic importance from the standpoint of cost of treatment and more particularly from the standpoint of the quality of the oil following treatment, inasmuch as there is generally a pronounced polymerizing effect on the oil when the treatment is carried out at excessively high temperatures, affecting the color stability of such oil. The fact that no bottom steam is necessary with the Caldwell materials is indicative of the differences in the adsorptive nature of the two materials and also represents a considerable operating saving as regards the consumption of steam at the high temperatures necessary.

In order to show the bleaching efficiency of the Caldwell G sample on a refined cotton oil, in comparison with other well-known natural and acid-activated bleaching materials, a number of tests were conducted on a cotton oil having an original color of 35 yellow and 8 red, using the standard AOC tests except as regards the percentages of bleaching materials employed. In order that the comparisons might be made more readily, a sufficient quantity of each of the bleaching materials was used to bring the color of the oil to approximately 20 yellow and 5 red (which was the color obtained with 6% of the American oil Chemists Society's standard English earth), and the efficiencies are reported below in Table VIII on the basis of such standard earth as 100%.

TABLE VIII

| Material | Percent employed | Color obtained | Bleaching efficiency |
|---|---|---|---|
| English earth (AOC standard bleaching clay). | 6 | 20 yellow, 5.0 red | Percent 100 |
| Best acid-activated clay, prepared for cotton oil use. | 3 | 20 yellow, 5.0 red | 200 |
| Best Texas natural clay. | 3 | 20 yellow, 5.2 red | 200 |
| Caldwell G | 1 | 20 yellow, 4.8 red | 600 |

Methods of preparing hydrated magnesium silicate decolorizing materials involving the formation of precipitated hydrated calcium silicate by reaction of a reactive calcium salt with a soluble alkali metal silicate in aqueous solution and the conversion of such a preciptated calcium silicate to hydrated magnesium silicate by hydrothermal reaction with a magnesium salt, as illustrated by Examples 6 and 7 above, are more fully described and claimed in my copending application Serial No. 63,376, filed February 11, 1936.

I claim:

1. The method of making a decolorizing material which comprises: forming a mixture of finely divided material containing a substantial proportion of calcium silicate, and an aqueous solution of a soluble magnesium salt of a strong acid; heating said mixture and simultaneously agitating it sufficiently to maintain the solids in suspension to cause formation of a solid hydrated magnesium silicate and a calcium salt of said strong acid by hydrothermal reaction of said calcium silicate with said magnesium salt, and to produce a solid decolorizing material containing a substantial proportion of said hydrated magnesium silicate; and separating said declorizing material from the remaining aqueous liquid.

2. The method set forth in claim 1, in which the proportions of calcium silicate and magnesium salt in said mixture and the duration of said hydrothermal reaction are such as to produce a solid decolorizing material consisting principally of said solid hydrated magnesium silicate.

3. The method of making a decolorizing material which comprises: forming a mixture of finely divided material containing a substantial proportion of hydrated calcium silicate, and an aqueous solution of a soluble magnesium salt of a strong acid; heating said mixture and simultaneously agitating it sufficiently to maintain the solids in suspension to cause formation of a solid hydrated magnesium silicate and a calcium salt of said strong acid by hydrothermal reaction of said hydrated calcium silicate with said magnesium salt, and to produce a solid decolorizing material containing a substantial proportion of said solid hydrated magnesium silicate; and separating said decolorizing material from the remaining aqueous liquid.

4. The method of making a decolorizing material from a solid silicate starting material containing lime and silica in chemical combination and having a given mol ratio between the contained acid and basic radicals of less than 1 to 1, which comprises: preparing a mixture of such starting material in finely divided condition, together with an added quantity of finely divided free silica, and an aqueous solution of a soluble magnesium salt of a strong acid; heating and simultaneously agitating said mixture sufficiently to maintain the solids in suspension and to cause formation, by hydrothermal reaction between the combined lime and silica present in said starting material, said added silica, and said magnesium salt, of a calcium salt of such strong acid and a solid hydrated magnesium silicate containing combined silica derived from said starting material and from said added silica and having a molecular ratio between the contained silica and magnesia greater than said given acid-base ratio, and to produce a solid decolorizing material containing a substantial proportion of said hydrated magnesium silicate; and separating said solid decolorizing material from the remaining aqueous liquid.

5. The method set forth in claim 4, said solid silicate starting material comprising Portland cement clinker.

6. The method of making a decolorizing material from a solid silicate starting material containing lime and silica in chemical combination and having a given mol ratio between the contained acid and basic radicals greater than 1 to 1, which comprises: preparing a mixture of such starting material in finely divided condition, together with an added quantity of finely divided free lime, and an aqueous solution of a soluble magnesium salt of a strong acid; heating and simultaneously agitating said mixture sufficiently to maintain the solids in suspension to cause formation by hydrothermal reaction between the combined lime and silica in said starting material, said added lime, and said magnesium salt, of a calcium salt of such strong acid containing calcium derived from said starting material and from said added lime and a solid hydrated magnesium silicate having a molecular ratio between the contained silica and magnesia less than said given acid-base ratio, and to produce a solid decolorizing material containing a substantial proportion of said hydrated magnesium silicate; and separating said solid decolorizing material from the remaining aqueous liquid.

7. The method set forth in claim 6, said solid silicate starting material comprising an acid slag.

8. The method of making a decolorizing material which comprises: forming a mixture of (a) finely divided material comprising a calcium silicate containing in chemical combination silicon dioxide and calcium oxide, said oxides being present in said silicate in a given mol ratio other than 1 to 1, (b) an added amount of that one of said oxides in finely divided chemically uncombined form which is present in said calcium silicate in less than said 1 to 1 ratio, and (c) an aqueous solution of a soluble magnesium salt of a strong acid; heating said mixture and simultaneously agitating it sufficiently to maintain the solids in suspension to cause formation, by hydrothermal reaction between said calcium silicate, added oxide, and magnesium salt, of a calcium salt of such strong acid and a solid hydrated magnesium silicate decolorizing material having a silica: magnesia ratio different from said given mol ratio; and separating said solid decolorizing material from the remaining aqueous liquid.

9. The method of decolorizing liquids which comprises contacting a liquid containing coloring matter with a decolorizing material containing a substantial proportion of hydrated magnesium silicate prepared by hydrothermal reaction under conditions of agitation between a calcium-containing silicate and a soluble magnesium salt of a strong acid, maintaining said decolorizing material in contact with said liquid to effect adsorption of coloring matter from said liquid, and separating said decolorizing material and the adsorbed coloring matter from said liquid.

10. The method of decolorizing liquids which comprises contacting a liquid containing coloring matter with a decolorizing material consisting principally of hydrated magnesium silicate prepared by hydrothermal reaction under conditions of agitation between a calcium-containing silicate and a soluble magnesium salt of a strong acid, maintaining said decolorizing material in contact with said liquid to effect adsorption of coloring matter from said liquid, and separating said decolorizing material and the adsorbed coloring matter from said liquid.

11. The method of decolorizing liquids which comprises contacting a liquid containing coloring matter with a decolorizing material containing a substantial proportion of hydrated magnesium silicate prepared by hydrothermal reaction under conditions of agitation between a hydrated calcium-containing silicate and a soluble magnesium salt of a strong acid, maintaining said decolorizing material in contact with said liquid to effect adsorption of coloring matter from said liquid, and separating said decolorizing material and the adsorbed coloring matter from said liquid.

12. The method of decolorizing liquids which comprises contacting a liquid containing coloring matter with a decolorizing material having an apparent volume between 1.8 and 3.5 ccs. per gram and containing a substantial proportion of hydrated magnesium silicate prepared by hydrothermal reaction under conditions of agitation between a calcium-containing silicate and a soluble magnesium salt of a strong acid, maintaining said decolorizing material in contact with said liquid to effect adsorption of coloring matter from said liquid, and separating said decolorizing material and the adsorbed coloring matter from said liquid.

13. The method of decolorizing liquids which comprises contacting a liquid containing coloring matter with a decolorizing material containing a substantial proportion of hydrated magnesium silicate prepared by hydrothermal reaction under conditions of agitation between a calcium-containing silicate and a soluble magnesium salt of a strong acid, and which exhibits substantially its full bleaching effect at a temperature materially below 300° F., maintaining said decolorizing material in contact with said liquid at a superatmospheric temperature below about 300° F to effect adsorption of coloring matter from said liquid, and separating said decolorizing material and the adsorbed coloring matter from said liquid.

LYLE CALDWELL.